(12) United States Patent
Zhu et al.

(10) Patent No.: US 10,966,104 B2
(45) Date of Patent: Mar. 30, 2021

(54) EMAIL SYNCHRONIZATION METHOD AND DEVICE

(71) Applicant: Huawei Technologies Co., Ltd., Shenzhen (CN)

(72) Inventors: Dengkui Zhu, Beijing (CN); Quanquan Wang, Beijing (CN); Jingquan Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/614,564

(22) PCT Filed: Jul. 18, 2017

(86) PCT No.: PCT/CN2017/093427
§ 371 (c)(1),
(2) Date: Nov. 18, 2019

(87) PCT Pub. No.: WO2018/209790
PCT Pub. Date: Nov. 22, 2018

(65) Prior Publication Data
US 2020/0092734 A1    Mar. 19, 2020

(30) Foreign Application Priority Data
May 17, 2017   (CN) .......................... 201710349600.2

(51) Int. Cl.
*H04W 4/12*      (2009.01)
*H04W 24/02*     (2009.01)
(Continued)

(52) U.S. Cl.
CPC ............. *H04W 24/02* (2013.01); *H04W 4/12* (2013.01); *H04W 52/02* (2013.01); *H04W 56/0015* (2013.01); *H04W 88/06* (2013.01)

(58) Field of Classification Search
None
See application file for complete search history.

(56) References Cited

U.S. PATENT DOCUMENTS

2003/0059005 A1 *   3/2003  Meyerson .............. H04L 51/36
                                                    379/88.17
2004/0266441 A1    12/2004  Sinha et al.
(Continued)

FOREIGN PATENT DOCUMENTS

CN    101292235 A    10/2008
CN    102420852 A     4/2012
(Continued)

OTHER PUBLICATIONS

Machine Translation and Abstract of Chinese Publication No. CN102420852, Apr. 18, 2012, 14 pages.
(Continued)

*Primary Examiner* — Cai Y Chen
(74) *Attorney, Agent, or Firm* — Conley Rose, P.C.

(57) ABSTRACT

An email synchronization method includes obtaining, by a mobile terminal, current network signal quality of the mobile terminal after obtaining an email synchronization instruction, and canceling, by the mobile terminal, execution of a synchronization operation when the network signal quality is less than a first preset threshold.

20 Claims, 13 Drawing Sheets

(51) Int. Cl.
  *H04W 52/02* (2009.01)
  *H04W 56/00* (2009.01)
  *H04W 88/06* (2009.01)

(56) References Cited

U.S. PATENT DOCUMENTS

| | | |
|---|---|---|
| 2006/0056336 A1 | 3/2006 | Dacosta |
| 2011/0002342 A1* | 1/2011 | Zheng ............... H04L 63/0892 370/401 |
| 2011/0002343 A1 | 1/2011 | Dacosta |
| 2011/0069649 A1 | 3/2011 | Gobriel et al. |
| 2012/0221651 A1* | 8/2012 | Rabii .................. H04L 51/38 709/206 |
| 2013/0283283 A1* | 10/2013 | Wang .................. H04M 1/67 718/102 |
| 2014/0169281 A1 | 6/2014 | Wang et al. |

FOREIGN PATENT DOCUMENTS

| | | |
|---|---|---|
| CN | 104767773 A | 7/2015 |
| CN | 104782171 A | 7/2015 |
| CN | 105933381 A | 9/2016 |
| CN | 106341874 A | 1/2017 |
| EP | 1428363 B1 | 7/2009 |

OTHER PUBLICATIONS

Machine Translation and Abstract of Chinese Publication No. CN104767773, Jul. 8, 2015, 19 pages.
Machine Translation and Abstract of Chinese Publication No. CN105933381, Sep. 7, 2016, 10 pages.
Machine Translation and Abstract of Chinese Publication No. CN106341874, Jan. 18, 2017, 8 pages.
Foreign Communication From a Counterpart Application, PCT Application No. PCT/CN2017/093427, English Translation of International Search Report dated Feb. 1, 2018, 2 pages.
Foreign Communication From a Counterpart Application, PCT Application No. PCT/CN2017/093427, English Translation of Written Opinion dated Feb. 1, 2018, 6 pages.
Foreign Communication From a Counterpart Application, Chinese Application No. 201780008431.4, Office Action dated Dec. 19, 2019, 10 pages.

* cited by examiner

EMAIL SYNCHRONIZATION METHOD AND DEVICE

CROSS-REFERENCE TO RELATED APPLICATIONS

This application is a U.S. National Stage of International Patent Application No. PCT/CN2017/093427 filed on Jul. 18, 2017, which claims priority to Chinese Patent Application No. 201710349600.2 filed on May 17, 2017. Both of the aforementioned applications are hereby incorporated by reference in their entireties.

TECHNICAL FIELD

Embodiments of this application relate to the terminal field, and in particular, to an email synchronization method and a device.

BACKGROUND

With the continuous development of communications technologies, Email (Electronic Mail, E-mail) has become an important means for people to communicate in daily life. Email is a communication mode in which information exchange is provided by using an electronic means. A user can communicate with another user quite fast at quite low costs by using an email system.

A synchronization operation such as email check, calendar information synchronization, or contact information synchronization is a relatively important operation in an email use process. In the prior art, the synchronization operation may be performed according to a specific synchronization period, where the synchronization period may be set by default, or may be set by a user. For example, if the user sets an email check period to 15 minutes, a terminal on which Email is installed starts, from a current moment, to receive an email based on the period of 15 minutes. The synchronization operation may alternatively be performed after being triggered by the user.

SUMMARY

Embodiments of this application provides an email synchronization method, to resolve a problem that unnecessary power consumption is caused because a mobile terminal performs an unnecessary synchronization operation when network signal quality is poor.

To achieve the foregoing objective, the following technical solutions are used in the embodiments of this application.

According to a first aspect of the embodiments of this application, an email synchronization method is provided, and includes:

obtaining, by a mobile terminal, current network signal quality of the mobile terminal after obtaining an email synchronization instruction and canceling, by the mobile terminal, execution of a synchronization operation if the network signal quality is less than a first preset threshold.

In the email synchronization method provided in this embodiment of this application, after the mobile terminal obtains the email synchronization instruction, the mobile terminal obtains the current network signal quality of the mobile terminal, and cancels execution of the synchronization operation when the current network signal quality is less than the first preset threshold. This avoids unnecessary power consumption caused because the mobile terminal performs an unnecessary synchronization operation when the network signal quality is poor.

With reference to the first aspect, in a possible implementation, the email synchronization method may further include: executing, by the mobile terminal, the synchronization operation if the network signal quality is greater than or equal to the first preset threshold.

With reference to the first aspect or the foregoing possible implementation, in another possible implementation, the obtaining, by the mobile terminal, an email synchronization instruction may specifically include: receiving, by the mobile terminal, the email synchronization instruction triggered by a user.

With reference to the first aspect or the foregoing possible implementation, in another possible implementation, the obtaining, by the mobile terminal, an email synchronization instruction may specifically include: obtaining, by the mobile terminal, the email synchronization instruction triggered by the mobile terminal at a first synchronization time point, where the first synchronization time point is any synchronization time point in a synchronization period.

With reference to the first aspect or the foregoing possible implementations, in another possible implementation, the email synchronization method may further include: canceling, by the mobile terminal, execution of the synchronization operation if the network signal quality is greater than or equal to the first preset threshold and less than a second preset threshold, and the mobile terminal executes the synchronization operation at a second synchronization time point, where the second synchronization time point is a time point that is in the synchronization period and that is adjacent to and earlier than the first synchronization time point.

With reference to the first aspect or the foregoing possible implementations, in another possible implementation, the email synchronization method may further include executing, by the mobile terminal, the synchronization operation if the network signal quality is greater than or equal to the first preset threshold and less than the second preset threshold, and the synchronization operation is not executed at the second synchronization time point.

In this way, when the network signal quality is between "good" and "poor", and the synchronization operation is executed only when the synchronization operation is not executed at a prior time point adjacent to the first synchronization time point, so as to further avoid a problem of unnecessary power consumption caused because the mobile terminal fails in synchronization when the network signal quality is poor.

With reference to the first aspect or the foregoing possible implementations, in another possible implementation, the email synchronization method may further include: executing, by the mobile terminal, the synchronization operation if the network signal quality is greater than or equal to the second preset threshold.

With reference to the first aspect or the foregoing possible implementations, in another possible implementation, after the canceling, by the mobile terminal, execution of a synchronization operation, the email synchronization method may further include: monitoring, by the mobile terminal, the network signal quality; and executing, by the mobile terminal, the synchronization operation at a current time point if it is detected that the network signal quality is greater than or equal to the second preset threshold. In this way, when the network signal quality is converted from "poor" to "good", the synchronization operation is executed immediately, so as to resolve a problem that synchronization cannot be executed in time because the network signal quality is converted from "poor" to "good" but a next synchronization time point does not arrive.

With reference to the first aspect or the foregoing possible implementations, in another possible implementation, the email synchronization method may further include: configuring, by the mobile terminal, the synchronization period based on the network signal quality.

With reference to the first aspect or the foregoing possible implementations, in another possible implementation, after the canceling, by the mobile terminal, execution of a synchronization operation, the email synchronization method may further include: displaying, by the mobile terminal, prompt information, where the prompt information is used to instruct to cancel execution of the synchronization operation.

According to a second aspect of the embodiments of this application, a mobile terminal is provided, and includes: an obtaining unit configured to obtain current network signal quality of the mobile terminal after obtaining an email synchronization instruction; and an execution canceling unit, configured to cancel execution of a synchronization operation if the network signal quality obtained by the obtaining unit is less than a first preset threshold.

With reference to the second aspect, in a possible implementation, the mobile terminal may further include a synchronization unit, configured to execute the synchronization operation if the network signal quality is obtained by the obtaining unit is greater than or equal to the first preset threshold.

With reference to the second aspect or the foregoing possible implementation, in another possible implementation, the obtaining unit is specifically configured to receive the email synchronization instruction triggered by a user.

With reference to the second aspect or the foregoing possible implementation, in another possible implementation, the obtaining unit is specifically configured to obtain the email synchronization instruction triggered by the mobile terminal at a first synchronization time point, where the first synchronization time point is any synchronization time point in a synchronization period.

With reference to the second aspect or the foregoing possible implementations, in another possible implementation, the execution canceling unit is further configured to cancel execution of the synchronization operation if the network signal quality obtained by the obtaining unit is greater than or equal to the first preset threshold and less than a second preset threshold and the mobile terminal executes the synchronization operation at a second synchronization time point, where the second synchronization time point is a time point that is in the synchronization period and that is adjacent to and earlier than the first synchronization time point.

With reference to the second aspect or the foregoing possible implementations, in another possible implementation, the synchronization unit is further configured to execute the synchronization operation if the network signal quality is greater than or equal to the first preset threshold and less than the second preset threshold and the synchronization operation is not executed at the second synchronization time point.

With reference to the second aspect or the foregoing possible implementations, in another possible implementation, the synchronization unit is further configured to execute the synchronization operation if the network signal quality is greater than or equal to the second preset threshold.

With reference to the second aspect or the foregoing possible implementations, in another possible implementation, the mobile terminal may further include a monitoring unit, where the monitoring unit is configured to monitor the network signal quality; and the synchronization unit is further configured to execute the synchronization operation at a current time point if the monitoring unit detects that the network signal quality is greater than or equal to the second preset threshold.

With reference to the second aspect or the foregoing possible implementations, in another possible implementation, the mobile terminal may further include a configuration unit, configured to configure the synchronization period based on the network signal quality.

With reference to the second aspect or the foregoing possible implementations, in another possible implementation, the mobile terminal may further include a display unit, configured to display prompt information, where the prompt information is used to instruct to cancel execution of the synchronization operation.

According to a third aspect of the embodiments of this application, a mobile terminal is provided, and includes at least one processor and a memory, where the memory is configured to store a computer program, so that the computer program implements the email synchronization method according to any one of the first aspect or the possible implementations of the first aspect when being executed by the at least one processor.

According to a fourth aspect of the embodiments of this application, a mobile terminal is provided, and includes at least one processor, a memory, a modem, and a display, where the memory is configured to store a computer program, so that the computer program implements the email synchronization method according to any one of the first aspect or the possible implementations of the first aspect when being executed by the at least one processor.

Specifically, the processor is configured to obtain an email synchronization instruction. The modem is configured to obtain current network signal quality of the mobile terminal after the processor obtains the email synchronization instruction. The processor is further configured to cancel execution of a synchronization operation if the network signal quality is less than a first preset threshold.

With reference to the fourth aspect, in a possible implementation, the processor is further configured to execute the synchronization operation if the network signal quality is greater than or equal to the first preset threshold.

With reference to the fourth aspect or the foregoing possible implementation, in another possible implementation, the processor is specifically configured to receive the email synchronization instruction triggered by a user.

With reference to the fourth aspect or the foregoing possible implementation, in another possible implementation, the processor is specifically configured to obtain the email synchronization instruction triggered by the mobile terminal at a first synchronization time point, where the first synchronization time point is any synchronization time point in a synchronization period.

With reference to the fourth aspect or the foregoing possible implementations, in another possible implementation, the processor is further configured to cancel execution of the synchronization operation if the network signal quality is greater than or equal to the first preset threshold and less than a second preset threshold, and the mobile terminal executes the synchronization operation at a second synchronization time point, where the second synchronization time point is a time point that is in the synchronization period and that is adjacent to and earlier than the first synchronization time point.

With reference to the fourth aspect or the foregoing possible implementations, in another possible implementation, the processor is further configured to execute the synchronization operation if the network signal quality is greater than or equal to the first preset threshold and less than the second preset threshold and the synchronization operation is not executed at the second synchronization time point.

With reference to the fourth aspect or the foregoing possible implementations, in another possible implementation, the processor is further configured to execute, for the mobile terminal, the synchronization operation if the network signal quality is greater than or equal to the second preset threshold.

With reference to the fourth aspect or the foregoing possible implementations, in another possible implementation, the processor is further configured to monitor the network signal quality, and execute the synchronization operation at a current time point if it is detected that the network signal quality is greater than or equal to the second preset threshold.

With reference to the fourth aspect or the foregoing possible implementations, in another possible implementation, the processor may be further configured to configure the synchronization period based on the network signal quality.

With reference to the fourth aspect or the foregoing possible implementations, in another possible implementation, the display is configured to display prompt information, where the prompt information is used to instruct to cancel execution of the synchronization operation.

According to a fifth aspect of the embodiments of this application, a computer storage medium is provided, where the computer storage medium stores a computer program, so that the computer program implements the email synchronization method according to any one of the first aspect or the possible implementations of the first aspect when being executed by a processor.

According to a sixth aspect of the embodiments of this application, a computer program product is provided, where when the computer program product runs on a computer, the computer is caused to perform the email synchronization method according to the first aspect of this application and any one of the possible implementations of the first aspect.

DESCRIPTION OF EMBODIMENTS

In the specification and accompanying drawings of this application, the terms "first", "second", and so on are intended to distinguish between different objects or to distinguish between different processing for a same object, but do not indicate a particular order of objects. For example, a first synchronization time point and a second synchronization time point are different time points, and a first preset threshold and a second preset threshold are different values.

Figure 1:
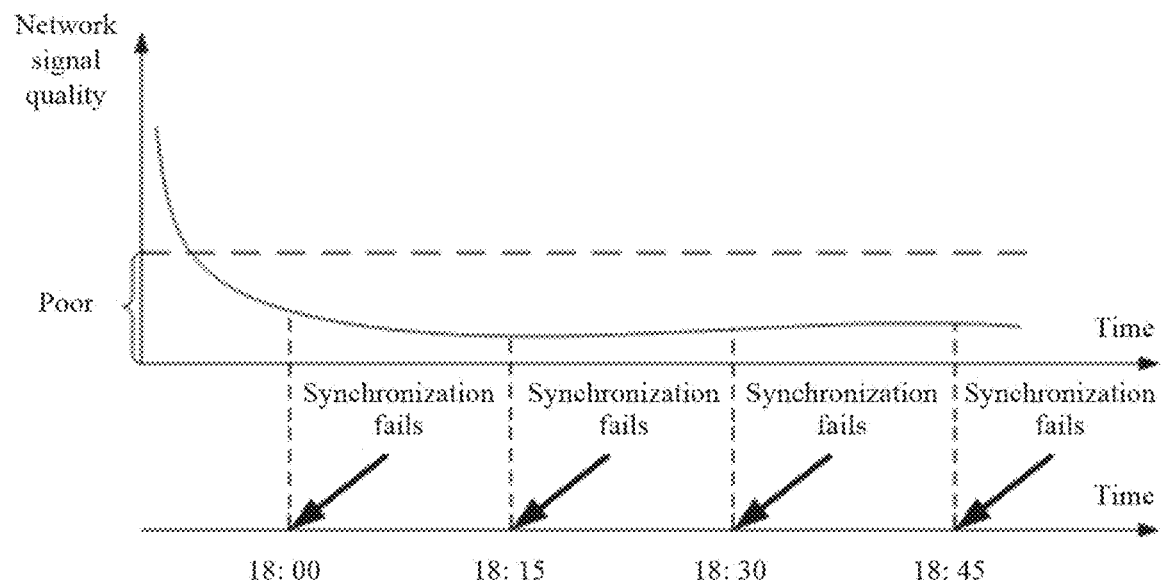
FIG. 1 is a schematic diagram of a synchronization scenario according to an embodiment of this application.

Usually, a synchronization operation is performed according to a specific synchronization period, or executed after being triggered by a user. At a synchronization time point or some synchronization time points, or after receiving trigger of the user, if network signal quality is poor, the mobile terminal performs an unnecessary synchronization operation, causing unnecessary power consumption of the mobile terminal. For example, in a scenario in which a synchronization operation is performed according to a synchronization period, as shown in FIG. 1, assuming that the synchronization period is 15 minutes, and a synchronization start time point is 18:00, if network signal quality is poor all the time, a case in which synchronization fails at a first synchronization time point 18:00, a second synchronization time point 18:15, a third synchronization time point 18:30, and a fourth synchronization time point 18:45 occurs, causing unnecessary power consumption of the mobile terminal. To resolve a problem that unnecessary power consumption is caused because the mobile terminal performs an unnecessary synchronization operation when network signal quality is poor, the embodiments of this application provide an email synchronization method. A basic principle of the method is as follows: The mobile terminal obtains current network signal quality of the mobile terminal after obtaining an email synchronization instruction; and the mobile terminal cancels execution of a synchronization operation if network signal quality is less than a first preset threshold. This avoids unnecessary power consumption caused because the mobile terminal performs an unnecessary synchronization operation when the network signal quality is poor.

The following describes implementations of the embodiments of this application in detail with reference to the accompanying drawings.

Figure 2:
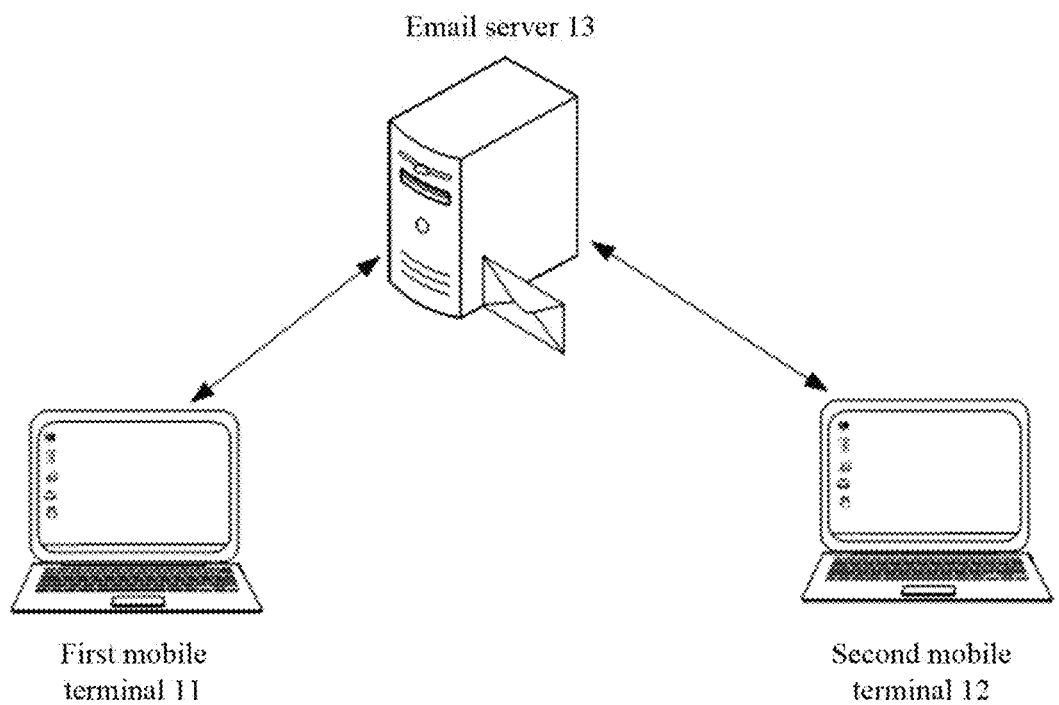
FIG. 2 is a simplified schematic diagram of an email synchronization system according to an embodiment of this application.

FIG. 2 is a simplified schematic diagram of an email synchronization system that may be applied to an embodiment of this application. As shown in FIG. 2, the email synchronization system may include a first mobile terminal 11, a second mobile terminal 12, and an email server 13.

Both the first mobile terminal 11 and the second mobile terminal 12 are devices having email sending and receiving functions.

Email sending and receiving may be performed between the first mobile terminal 11 and the second mobile terminal 12 by using the email server 13. For example, in an example, the first mobile terminal 11 is an email receiver, and the second mobile terminal 12 is an email sender.

In a specific implementation, for example, the first mobile terminal 11 and the second mobile terminal 12 each may be a mobile phone, a tablet computer, a notebook computer, an ultra-mobile personal computer (Ultra-mobile Personal Computer, UMPC), a netbook, a personal digital assistant (Personal Digital Assistant, PDA), or the like.

In addition, specific product forms of the first mobile terminal 11 and the second mobile terminal 12 may be the same or different. For example, the first mobile terminal 11 is a mobile phone and the second mobile terminal 12 is also a mobile phone, or the first mobile terminal 11 is a tablet computer and the second mobile terminal 12 is a mobile phone. This is not specifically limited in this embodiment of this application. In addition, there may be one or more mobile terminals that perform email transmission with the first mobile terminal 11 and/or the second mobile terminal 12.

The email server 13 may provide an email service for the first mobile terminal 11 and/or the second mobile terminal 12. For example, the email server 13 is used for forwarding an email transmitted between the first mobile terminal 11 and the second mobile terminal 12.

For example, when the first mobile terminal 11 is an email receiver and the second mobile terminal 12 is an email sender, the email server 13 may transmit, to the first mobile terminal 11, an email sent by the second mobile terminal 12.

Certainly, if the first mobile terminal 11 and the second mobile terminal 12 are provided with services by different email servers, and when the first mobile terminal 11 is an email receiver and the second mobile terminal 12 is an email sender, the second mobile terminal 12 may first transmit an email to an email server that provides a service for the second mobile terminal 12, and then the email server transmits the email to an email server that provides a service for the first mobile terminal 11, so that the email server that provides the service for the first mobile terminal 11 transmits the email to the first mobile terminal 11.

Figure 3:
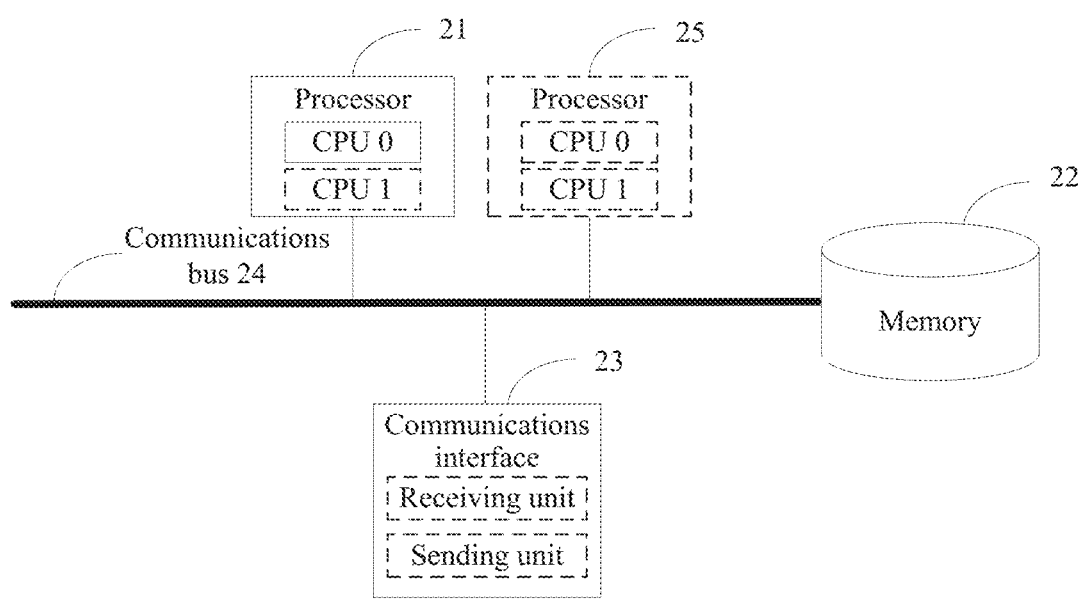
FIG. 3 is a schematic composition diagram of a mobile terminal according to an embodiment of this application.

FIG. 3 is a schematic composition diagram of a mobile terminal according to an embodiment of this application. The mobile terminal may be a mobile terminal serving as an email receiver, or a mobile terminal serving as an email sender. As shown in FIG. 3, the mobile terminal may include at least one processor 21, a memory 22, a communications interface 23, and a communications bus 24.

The following specifically describes each component part of the mobile terminal with reference to FIG. 3.

The processor 21 is a control center of the mobile terminal, and may be a processor, or may be general terms of a plurality of processing elements. For example, the processor 21 is a central processing unit (Central Processing Unit, CPU), or may be an application-specific integrated circuit (Application Specific Integrated Circuit, ASIC), or may be configured as one or more integrated circuits for implementing this embodiment of this application, for example, one or more microprocessors (Digital Signal Processor, DSP), or one or more field programmable gate arrays (Field Programmable Gate Array, FPGA).

The processor 21 may perform various functions of the mobile terminal by running or executing a software program stored in the memory 22 and invoking data stored in the memory 22.

In a specific implementation, in an embodiment, the processor 21 may include one or more CPUs, for example, a CPU 0 and a CPU 1 that are shown in FIG. 3.

In a specific implementation, in an embodiment, the mobile terminal may include a plurality of processors, for example, a processor 21 and a processor 25 that are shown in FIG. 3. Each of these processors may be a single-core processor (single-CPU) or a multi-core processor (multi-CPU). The processor herein may be one or more devices, circuits, and/or processing cores configured to process data (for example, a computer program instruction).

The memory 22 may be a read-only memory (Read-Only Memory, ROM) or another type of static storage device capable of storing static information and an instruction, a random access memory (Random Access Memory, RAM) or another type of dynamic storage device capable of storing information and an instruction, or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in an instruction or data structure form and capable of being accessed by a computer, but is not limited thereto. The memory 22 may exist independently, and is connected to the processor 21 by using the communications bus 24. The memory 22 may alternatively be integrated with the processor 21.

The memory 22 is configured to store the software program for executing a solution of this application, and the processor 21 controls execution of the software program.

The communications interface 23 uses any apparatus such as a transceiver and is configured to communicate with another device or a communications network, for example, an Ethernet, a radio access network (Radio Access Network, RAN), a wireless local area network (Wireless Local Area Networks, WLAN), and the like. The communications interface 23 may include a receiving unit for implementing a receiving function and a sending unit for implementing a sending function.

The communications bus 24 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified as an address bus, a data bus, a control bus, or the like. For ease of representation, the bus is represented by using only one thick line in FIG. 3. However, it does not indicate that there is only one bus or only one type of bus.

A device structure shown in FIG. 3 does not limit a to-be-accessed node, and may include components more or fewer than those shown in the figure, or a combination of some components, or components disposed differently. Although not shown, the mobile terminal may further include a battery, a camera, a Bluetooth module, a Global Positioning System (Global Position System, GPS) module, a display screen, and the like. Details are not described herein.

Figure 4:
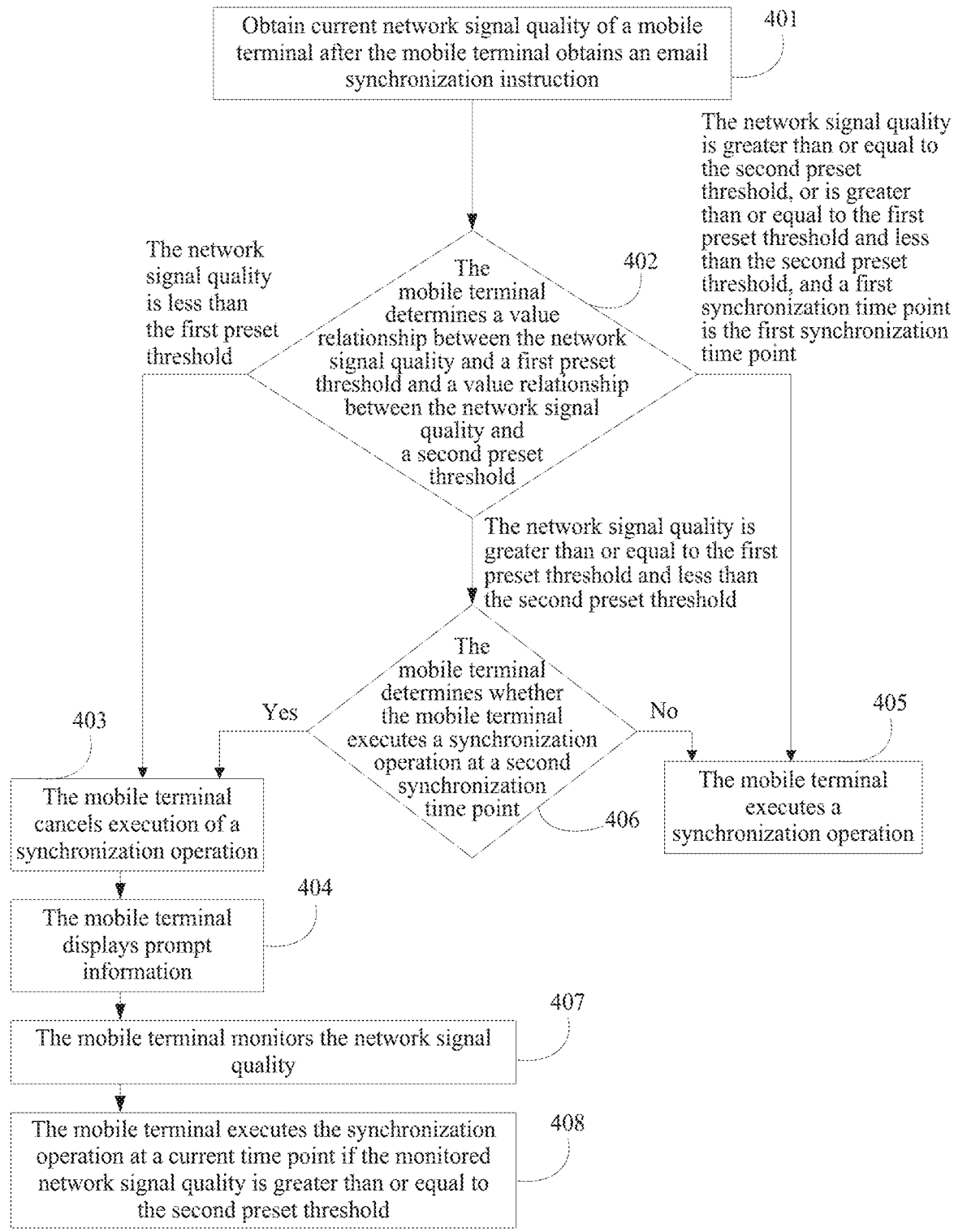
FIG. 4 is a flowchart of an email synchronization method according to an embodiment of this application.

FIG. 4 is a flowchart of an email synchronization method according to an embodiment of this application. As shown in FIG. 4, the method may include the following steps:

401. Obtain current network signal quality of a mobile terminal after the mobile terminal obtains an email synchronization instruction.

For example, the mobile terminal may obtain the current network signal quality of the mobile terminal from a modem (modem) of the mobile terminal after obtaining the email synchronization instruction.

It should be noted that, in this embodiment of this application, the network signal quality may be indicated by an indicator such as reference signal received power (Reference Signal Received Power, RSRP) or reference signal received quality (Reference Signal Received Quality, RSRQ), and no specific limitations are imposed on the indicator indicating the network signal quality.

The obtaining, by the mobile terminal, an email synchronization instruction may be specifically obtaining, by the mobile terminal, the email synchronization instruction triggered by the mobile terminal at a first synchronization time point.

The first synchronization time point is any synchronization time point in a synchronization period. For example, the first synchronization time point may be the first synchronization time point in the synchronization period, or any other synchronization time point. This is not limited in this embodiment of this application. For example, if the synchronization period is 10 minutes, and a synchronization start time point is 9:00, the first synchronization time point may be 9:00, or may be any other synchronization time point such as 9:30 and 10:00.

Further, before step 401, the email synchronization method may further include configuring, by the mobile terminal, the email synchronization period of the mobile terminal.

Assuming that the first synchronization time point is the first synchronization time point that is after the email synchronization period is configured, the mobile terminal may automatically trigger the email synchronization instruction at the first synchronization time point that is after the email synchronization period is configured.

Figure 5:
FIG. 5 is a schematic diagram of an email interface according to an embodiment of this application.

For example, assuming that the mobile terminal is a notebook computer, as shown in FIG. 5, a notebook computer is installed with an email application (application, APP). When a user needs to use the app, for example, when the user needs to send or receive an email, the user may enable the email app to enter a main interface of the email app shown in FIG. 6.

Figure 7A:
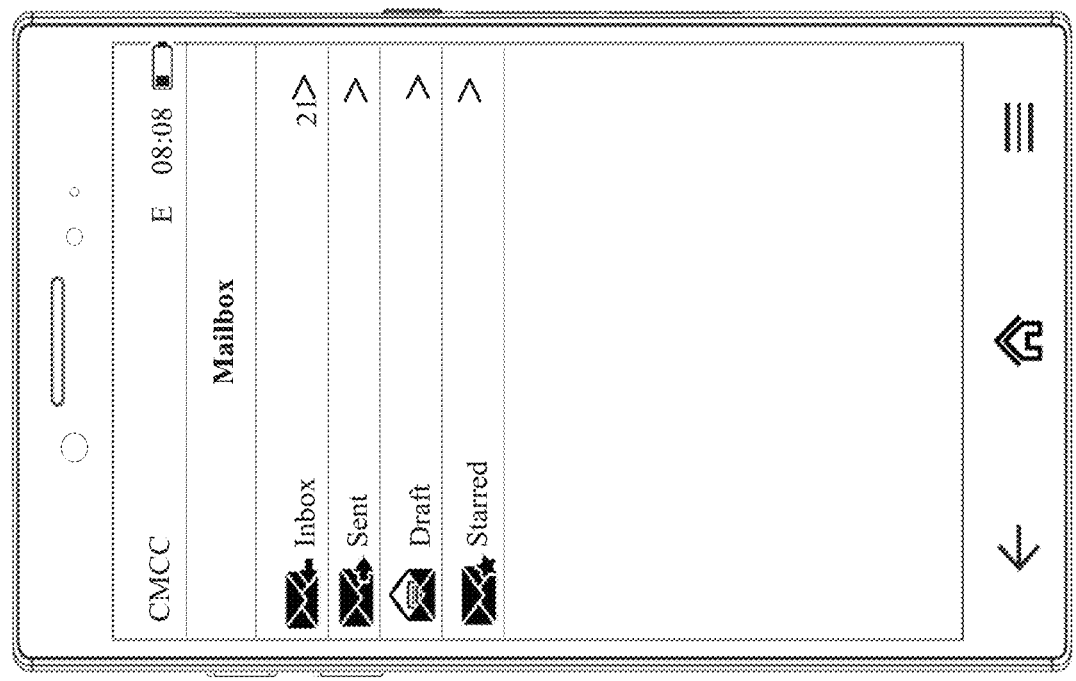
FIG. 7(*a*) and FIG. 7(*b*) are a schematic diagram of another email interface according to an embodiment of this application.
Figure 7B:
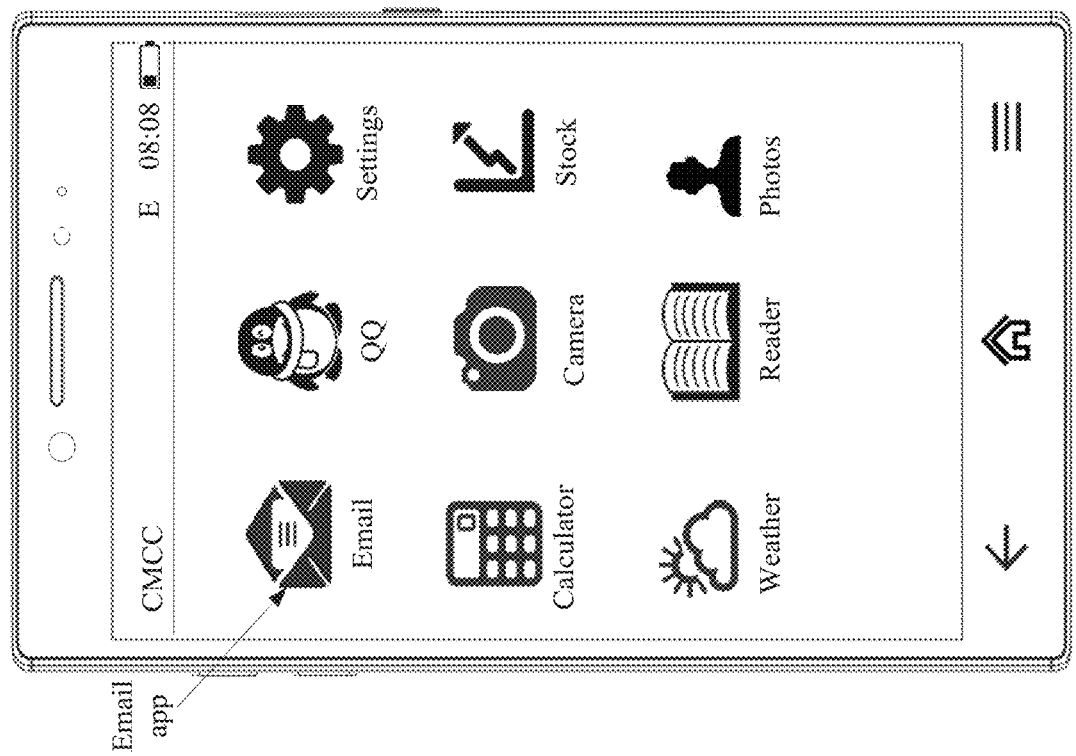

For another example, assuming that the mobile terminal is a mobile phone, as shown in (a) of FIG. 7, a mobile phone is installed with an email app. When needing to use the email app, the user may perform a triggering operation on an icon of the email app, for example, a click operation. As shown in (b) of FIG. 7, the mobile phone displays a main interface of the email app.

Figure 8:
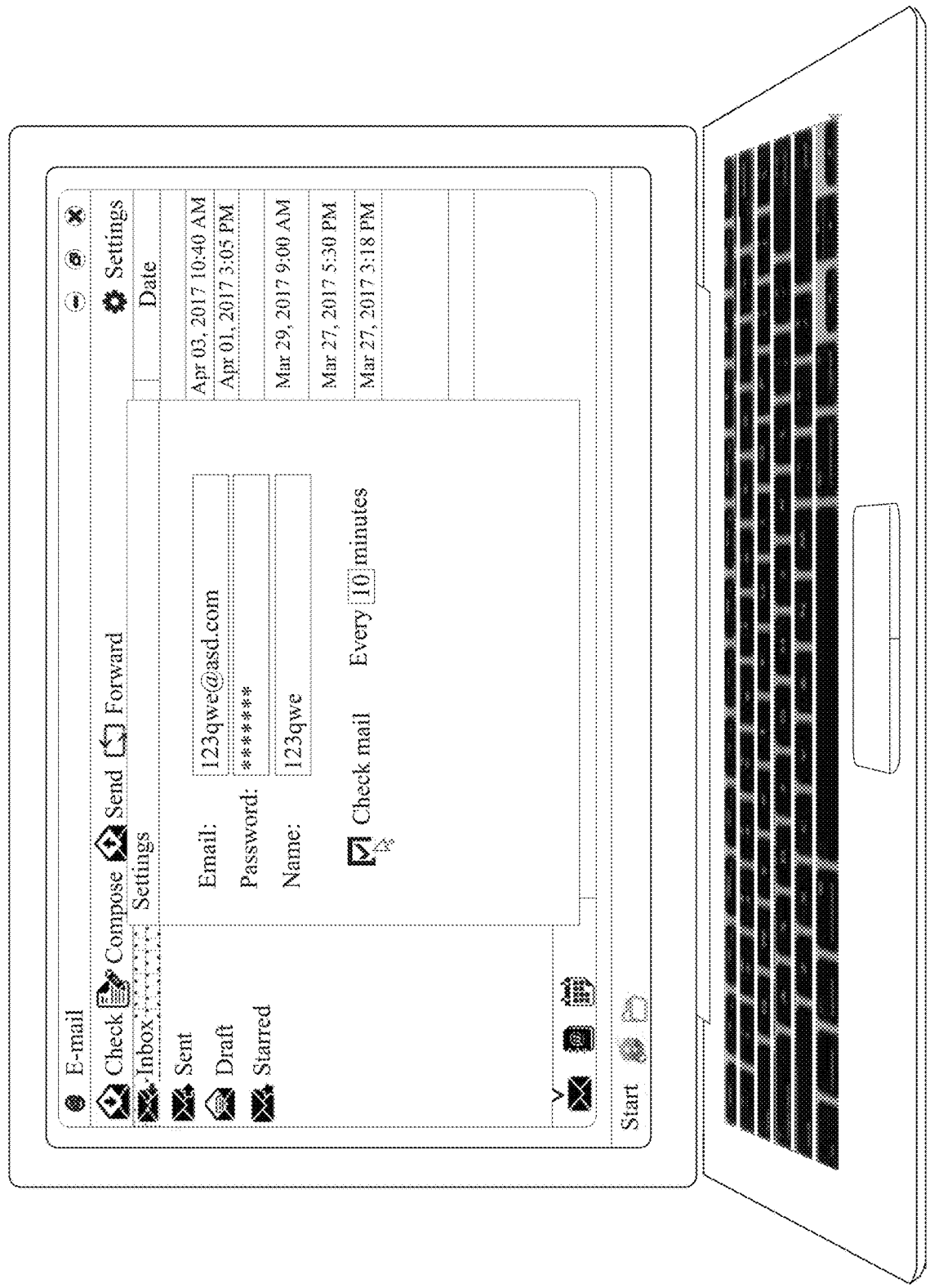
FIG. 8 is a schematic diagram of another email interface according to an embodiment of this application.

For example, after the email app is enabled, the user may manually set an email synchronization period or use a default synchronization period of a system. Alternatively, the mobile terminal may configure a synchronization period based on current network signal quality. The mobile terminal may perform corresponding configuration based on setting of the email synchronization period, so that a synchronization operation may be performed periodically. For example, assuming that the synchronization operation is email check, and assuming that the mobile terminal is a notebook computer, as shown in FIG. 8, the user may manually select "check email periodically", and set an email check period to 10 minutes, that is, checking emails every 10 minutes.

It should be noted that, in this embodiment of this application, the synchronization operation is a required operation of periodically performing data interaction with a server in an email app. For example, the synchronization operation may include one or a combination of the following: email check, calendar information synchronization, contact information synchronization, and the like.

402. The mobile terminal determines a value relationship between the network signal quality and a first preset threshold and a value relationship between the network signal quality and a second preset threshold.

After obtaining the current network signal quality of the mobile terminal, the mobile terminal may determine the value relationship between the obtained network signal quality and the first preset threshold and the value relationship between the obtained network signal quality and the second preset threshold, where the first preset threshold is less than the second preset threshold.

If the network signal quality is less than the first preset threshold, step 403 and step 404 are executed. If the network signal quality is greater than or equal to the second preset threshold, step 405 is executed. If the network signal quality is greater than or equal to the first preset threshold and less than the second preset threshold, step 406 is executed. If the network signal quality is greater than or equal to the first preset threshold and less than the second preset threshold, and the first synchronization time point is the first synchronization time point, step 405 is directly executed.

It should be noted that, in this embodiment of this application, specific values of the first preset threshold and the second preset threshold may be set based on a requirement of an actual application scenario, and pre-configured in the mobile terminal. The values of the first preset threshold and the second preset threshold are not specifically limited herein in this embodiment of this application.

403. The mobile terminal cancels execution of a synchronization operation.

If the mobile terminal determines that the obtained current network signal quality is less than the first preset threshold, it indicates that the current network signal quality is poor and synchronization cannot succeed during the synchronization operation. In this case, the mobile terminal may cancel execution of the synchronization operation. In other words, after obtaining the email synchronization instruction, the mobile terminal does not perform the synchronization operation. Specifically, the mobile terminal does not perform the synchronization operation at the first synchronization time point.

In this embodiment of this application, the canceling, by the mobile terminal, execution of a synchronization operation may specifically be skipping, by the mobile terminal, execution of the synchronization operation.

404. The mobile terminal displays prompt information.

Figure 9:
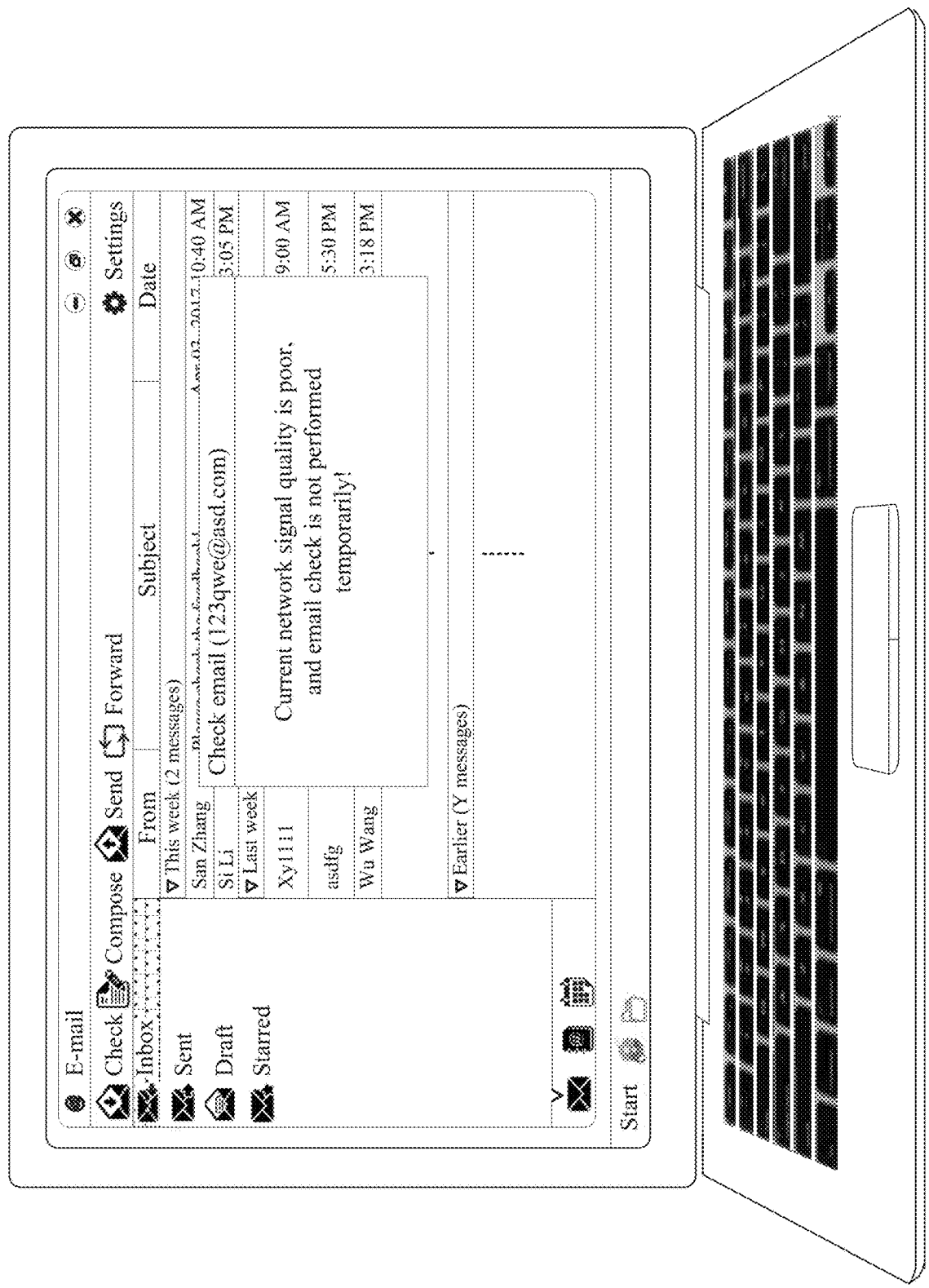
FIG. 9 is a schematic diagram of another email interface according to an embodiment of this application.

After canceling execution of the synchronization operation, the mobile terminal may display the prompt information, where the prompt information is used to cancel execution of the synchronization operation, to indicate the user that the current network signal quality is poor and the synchronization operation is not performed temporarily. For example, as shown in FIG. 9, assuming that the synchronization operation is email check, the mobile terminal may display prompt information, to indicate, to the user, that current network signal quality is poor and email check is not performed temporarily.

405. The mobile terminal executes a synchronization operation.

If the mobile terminal determines that the obtained current network signal quality is greater than or equal to the second preset threshold, it indicates that the current network signal quality is "good", and in this case, the mobile terminal may execute the synchronization operation, for example, email check, at the first synchronization time point. In addition, the mobile terminal may continue to wait for performing the synchronization operation at a next synchronization time point.

406. The mobile terminal determines whether the mobile terminal executes a synchronization operation at a second synchronization time point.

The second synchronization time point is a time point that is in the synchronization period and that is adjacent to and earlier than the first synchronization time point. If it is determined that the obtained current network signal quality is greater than or equal to the first preset threshold and less than the second preset threshold, it indicates that the current network signal quality is between "good" and "poor". In this case, the mobile terminal may first determine whether the synchronization operation is executed at a time point that is in the synchronization period and that is adjacent to and earlier than the first synchronization time point, that is, the second synchronization time point. If the mobile terminal executes the synchronization operation at the second synchronization time point, step 403 is executed, to be specific, if the mobile terminal executes the synchronization operation at the second synchronization time point, the mobile terminal may not execute the synchronization operation at the first synchronization time point, to avoid a case in which an increase of power consumption of the mobile terminal is caused because synchronization fails when the current network signal quality is between "good" and "poor". If the mobile terminal does not execute the synchronization operation at the second synchronization time point, step 405 is executed, to be specific, if the mobile terminal does not execute the synchronization operation at the second synchronization time point, the mobile terminal may execute the synchronization operation at the first synchronization time point.

In addition, further, after step 403 of canceling execution of a synchronization operation, the email synchronization method may further include step 407 and step 408.

407. The mobile terminal monitors the network signal quality.

After the mobile terminal cancels execution of the synchronization operation, to perform timely synchronization after the network signal quality changes from "poor" to "good", the mobile terminal may monitor the network signal quality.

Figure 10:
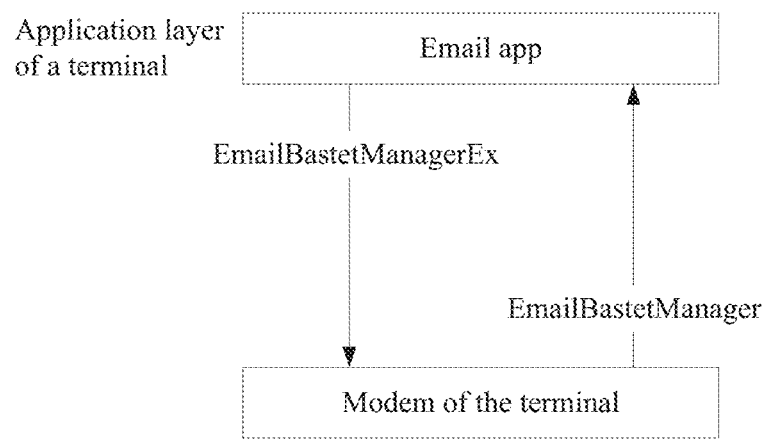
FIG. 10 is a schematic diagram of monitoring network signal quality according to an embodiment of this application.

For example, as shown in FIG. 10, when the mobile terminal is a mobile phone, an application layer (which is an email app specifically) of the mobile phone may call a first API configured to monitor the network signal quality, for example, the first API is EmailBastetManagerEx, so as to monitor the network signal quality of the mobile terminal in real time. In addition, when a modem of the mobile terminal detects that the network signal quality changes, a second API configured to obtain the network signal quality when the network signal quality changes may be called, for example, the second API is EmailBastetManager, so as to report changed network signal quality to the application layer of the mobile terminal.

408. The mobile terminal executes the synchronization operation at a current time point if the monitored network signal quality is greater than or equal to the second preset threshold.

The current time point may be a time point at which it is determined that the network signal quality is greater than or equal to the second preset threshold. If the monitored network signal quality is greater than or equal to the second preset threshold, it indicates that network signal quality changes from "poor" to "good". In this case, the mobile terminal may execute the synchronization operation at the current time point without waiting for a next synchronization time point, and the synchronization period restarts from the current time point.

Figure 11:
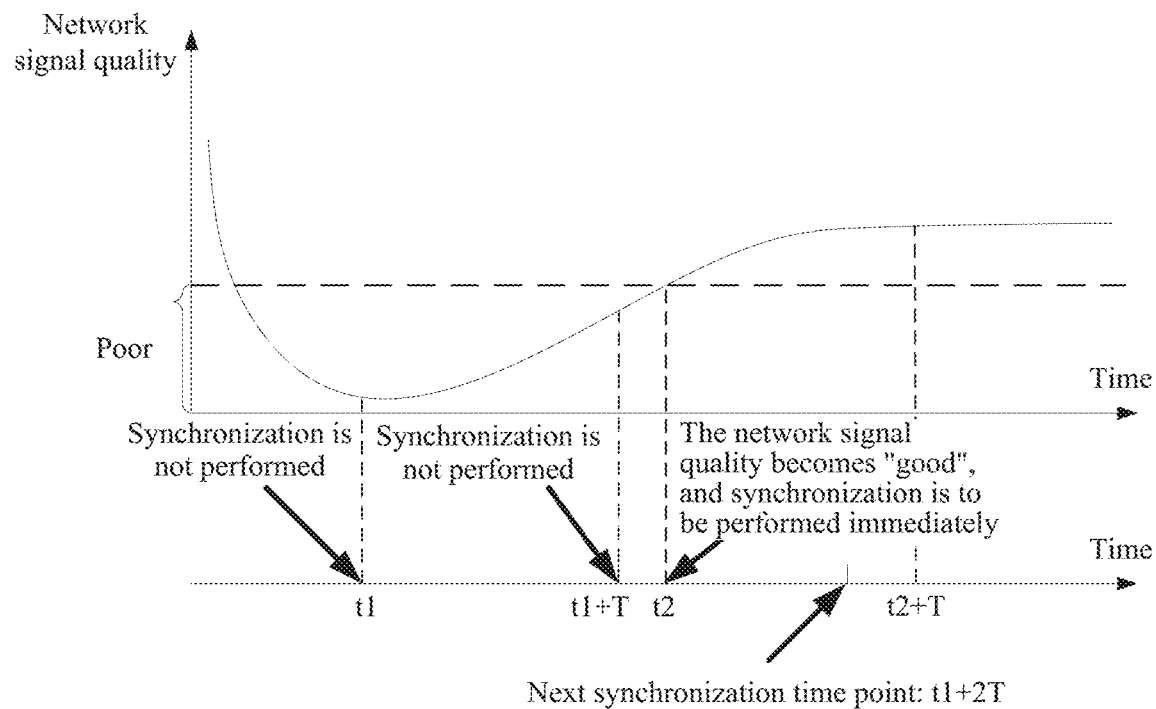
FIG. 11 is a schematic diagram of another synchronization scenario according to an embodiment of this application.

For example, as shown in FIG. 11, at a moment t1, because network signal quality is poor, the mobile terminal does not execute a synchronization operation, and at a moment t1+T (T is the synchronization period), if the network signal quality is still poor, the mobile terminal still does not execute the synchronization operation. At a moment t2, the network signal quality becomes "good", and in this case, the mobile terminal executes the synchronization operation at the moment t2 without waiting for a next synchronization time point, that is, a moment t1+2T. The synchronization period restarts from the moment t2.

Figure 12:
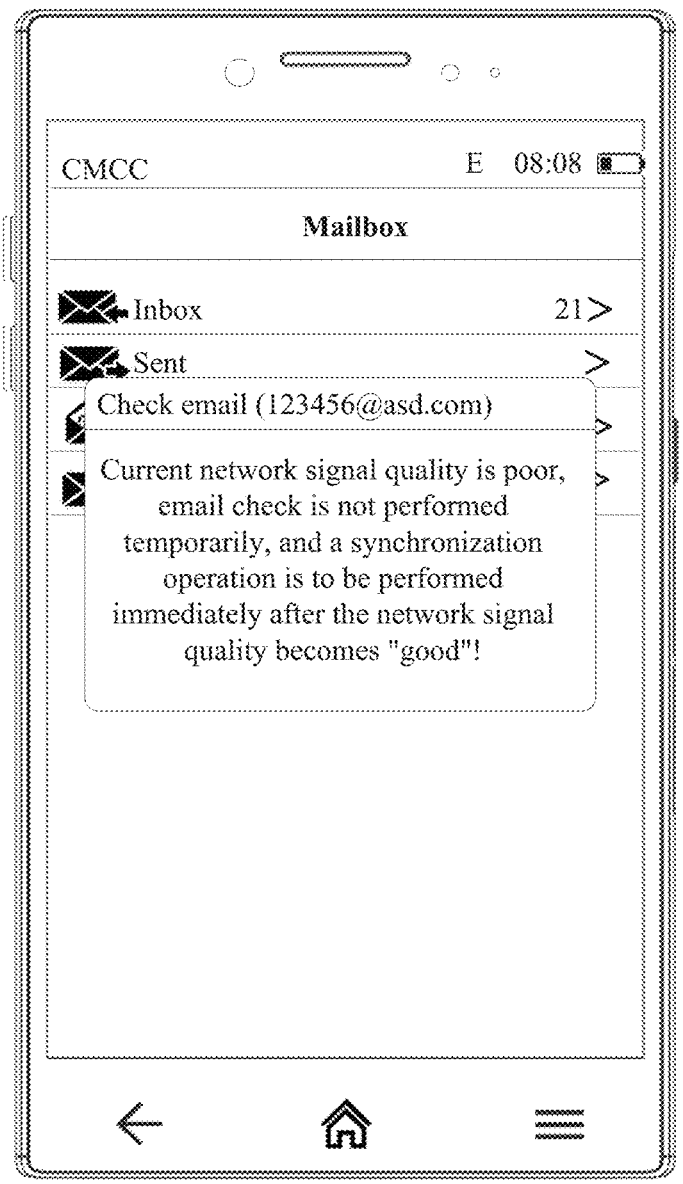
FIG. 12 is a schematic diagram of another email interface according to an embodiment of this application.

In addition, the prompt information in step 404 may also indicate to the user that the synchronization operation is to be performed immediately after the network signal quality becomes "good". For example, assuming that the mobile terminal is a mobile phone, the synchronization operation is email check. FIG. 12 shows prompt information displayed by the mobile phone, where the prompt information indicates to the user that current network signal quality is poor, email check is not performed temporarily, and the synchronization operation is to be performed immediately after the network signal quality becomes "good".

Certainly, if the mobile terminal detects that the current network signal quality is still less than the first preset threshold, or is greater than the first preset threshold and less than the second preset threshold, step 407 is executed again, so that the synchronization operation is performed immediately after the network signal quality recovers subsequently.

In the email synchronization method provided in this embodiment of this application, after the mobile terminal obtains the email synchronization instruction, the mobile terminal obtains the current network signal quality of the mobile terminal, and cancels execution of the synchronization operation when the current network signal quality is less than the first preset threshold. This avoids unnecessary power consumption caused because the mobile terminal performs an unnecessary synchronization operation when the network signal quality is poor. In addition, when the network signal quality is between "good" and "poor", the mobile terminal executes the synchronization operation only when determining that the synchronization operation is not performed at a time point that is in the synchronization period and that is adjacent to and earlier than the first synchronization time point, so as to further avoid unnecessary power consumption of the mobile terminal caused because synchronization fails. After canceling execution of the synchronization operation, the mobile terminal monitors the network signal quality and performs the synchronization operation immediately after the network signal quality recovers, so as to avoid a case of a non-timely synchronization operation.

Figure 13:
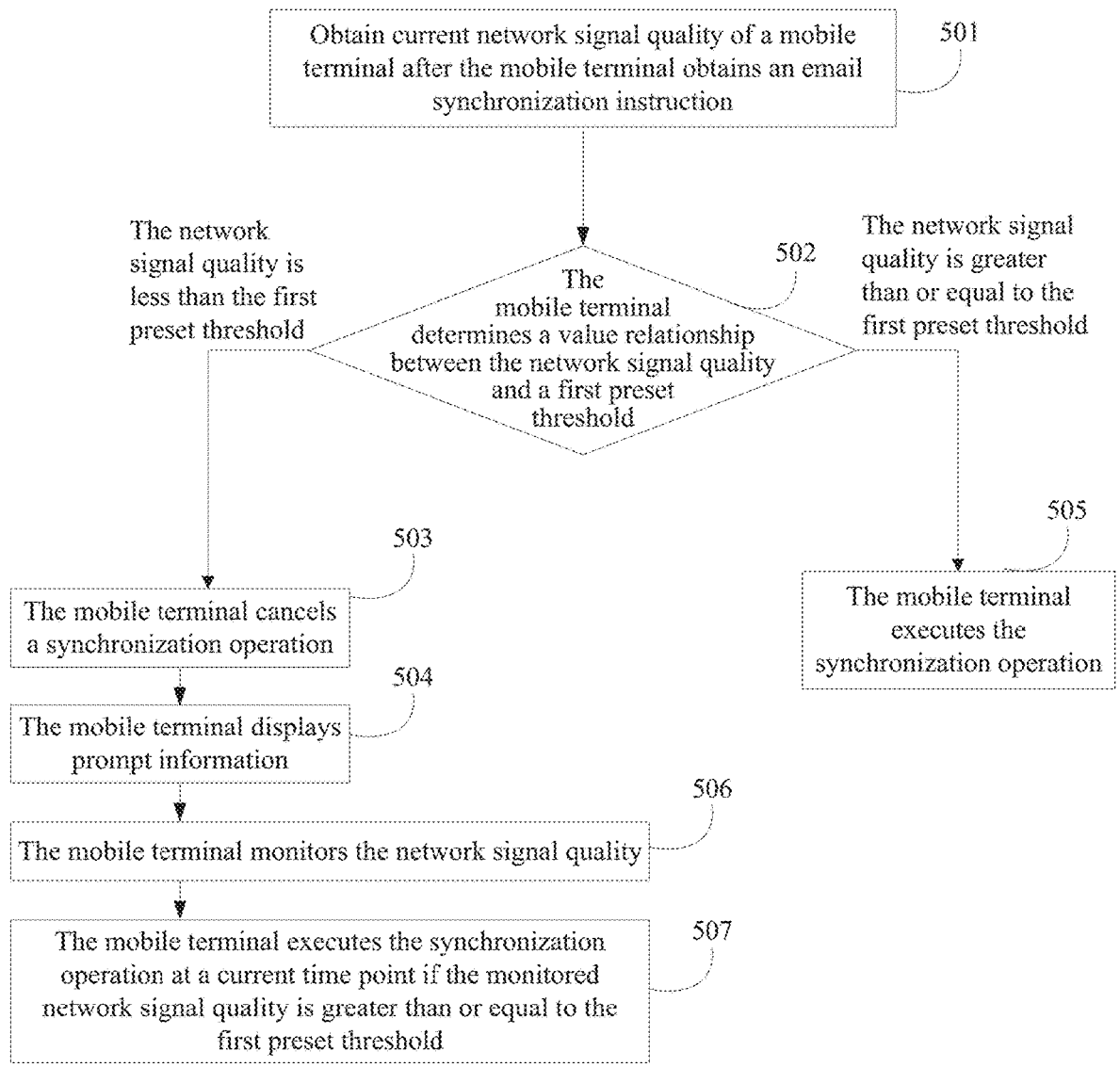
FIG. 13 is a flowchart of another email synchronization method according to an embodiment of this application.

FIG. 13 is a flowchart of another email synchronization method according to an embodiment of this application. As shown in FIG. 13, the method may include the following steps:

501. Obtain current network signal quality of a mobile terminal after the mobile terminal obtains an email synchronization instruction.

A specific manner in which the mobile terminal obtains the email synchronization instruction may be the manner described in step 401 of another embodiment in this application, or may be receiving, by the mobile terminal, the email synchronization instruction triggered by a user. Certainly, the specific manner may alternatively be a combination of the two manners.

For example, when the user needs to perform a synchronization operation such as email synchronization, calendar information synchronization, or contact information synchronization, the user may perform a triggering operation on a corresponding button. In this case, the mobile terminal may receive the email synchronization instruction triggered by the user, and may obtain current network signal quality of the mobile terminal after obtaining the email synchronization instruction.

Figure 6:
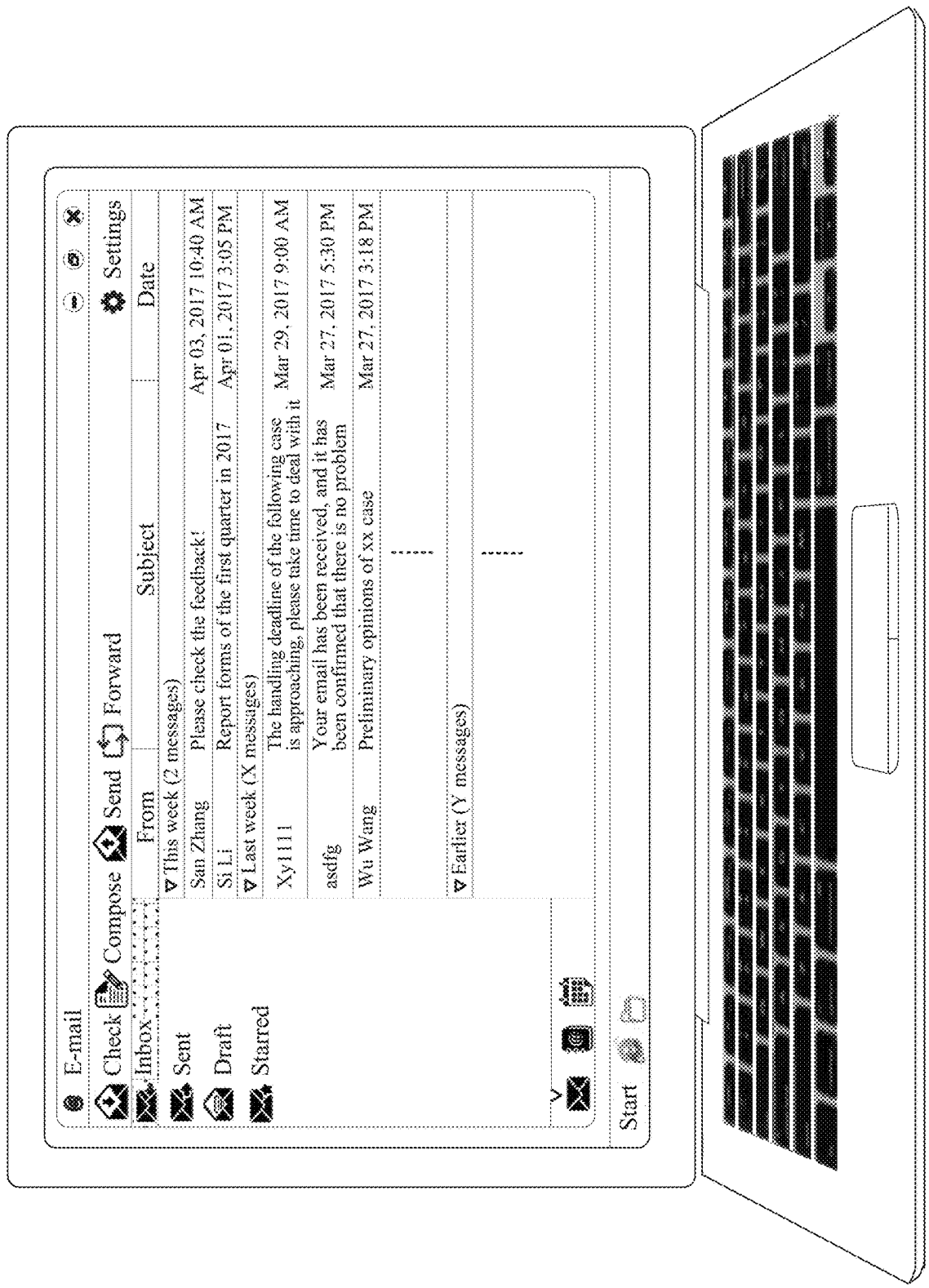
FIG. 6 is a schematic diagram of another email interface according to an embodiment of this application.
Figure 14:
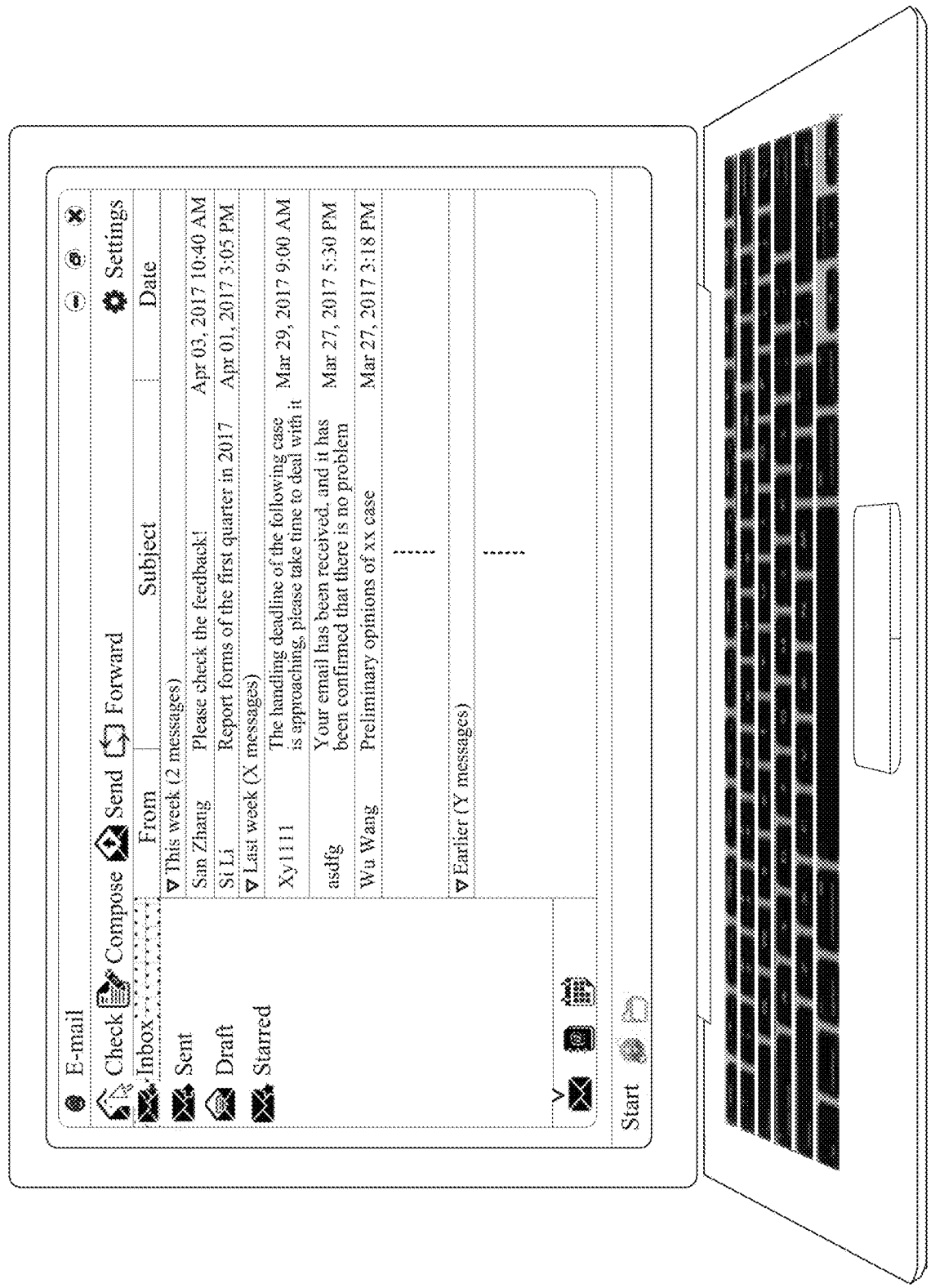
FIG. 14 is a schematic diagram of another email interface according to an embodiment of this application.

Based on FIG. 6, when the user needs to perform email synchronization, as shown in FIG. 14, the user may perform a triggering operation on a "check" button, and in this case, the mobile terminal may receive the email synchronization instruction of the user.

502. The mobile terminal determines a value relationship between the network signal quality and a first preset threshold.

If the network signal quality is less than the first preset threshold, step 503 and step 504 are executed. If the network signal quality is greater than or equal to the first preset threshold, step 505 is executed.

503. The mobile terminal cancels execution of a synchronization operation.

504. The mobile terminal displays prompt information.

505. The mobile terminal executes a synchronization operation.

In addition, further, after step 503 of canceling execution of a synchronization operation, the email synchronization method may further include step 506 and step 507.

506. The mobile terminal monitors the network signal quality.

507. The mobile terminal executes the synchronization operation at a current time point if the monitored network signal quality is greater than or equal to the first preset threshold.

It should be noted that, for specific descriptions of content in step 501 to step 507 of this embodiment of this application, refer to specific descriptions of content in step 401 to step 408 of another embodiment of this application. Details are not repeated herein in this embodiment of this application.

In the email synchronization method provided in this embodiment of this application, after the mobile terminal obtains the email synchronization instruction, the mobile terminal obtains the current network signal quality of the mobile terminal, and cancels execution of the synchronization operation when the current network signal quality is less than the first preset threshold. This avoids unnecessary power consumption caused because the mobile terminal performs an unnecessary synchronization operation when the network signal quality is poor. In addition, after canceling execution of the synchronization operation, the mobile terminal monitors the network signal quality and performs the synchronization operation immediately after the network signal quality recovers, so as to avoid a case of a non-timely synchronization operation.

The foregoing mainly describes, from the perspective of the mobile terminal, the solutions provided in the embodiments of this application. It may be understood that, to implement the foregoing functions, the mobile terminal includes a corresponding hardware structure and/or software module for performing each of the functions. A person of ordinary skill in the art should be easily aware that, the algorithm steps in the examples described with reference to the embodiments disclosed in this specification may be implemented by hardware or a combination of hardware and computer software in this application. Whether the functions are performed by hardware or computer software driving hardware depends on particular applications and design conditions of the technical solutions. A person skilled in the art may use different methods to implement the described functions for each particular application, but it should not be considered that the implementation goes beyond the scope of this application.

In this embodiment of this application, function modules of the mobile terminal may be divided based on the foregoing method example. For example, each function module may be divided according to each function, or two or more functions may be integrated into one processing module. The integrated module may be implemented in a form of hardware, or may be implemented in a form of a function module of software. It should be noted that the module division in the embodiments of this application is an example, and is merely logical function division. There may be another division manner in an actual implementation.

Figure 15:
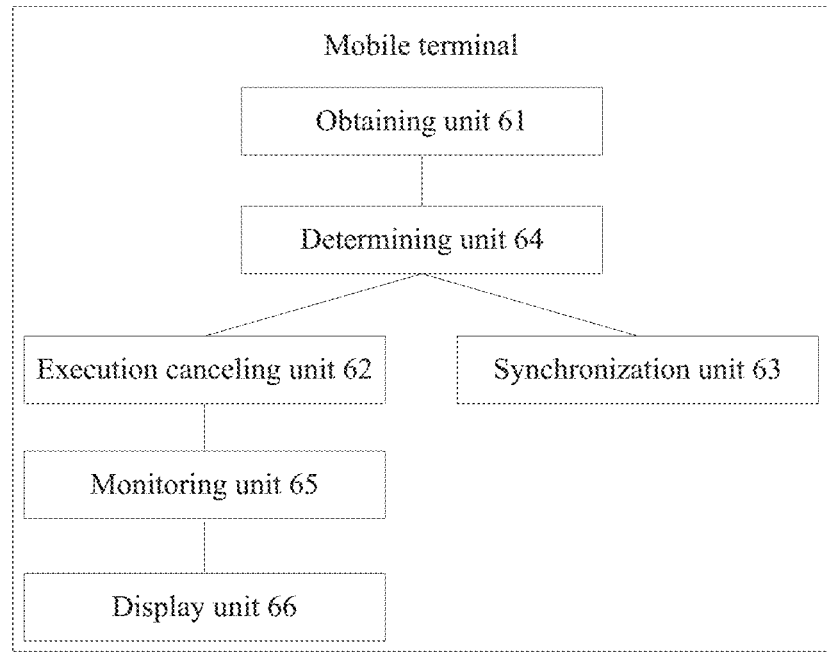
FIG. 15 is another schematic composition diagram of a mobile terminal according to an embodiment of this application.

When corresponding functions are used to divide function modules, FIG. 15 is a possible schematic composition diagram of the mobile terminal in the foregoing embodiments. As shown in FIG. 15, the mobile terminal may include an obtaining unit 61 and an execution canceling unit 62.

The obtaining unit 61 is configured to support the mobile terminal in executing step 401 in the email synchronization method shown in FIG. 4 and step 501 in the email synchronization method shown in FIG. 13.

The execution canceling unit 62 is configured to support the mobile terminal in executing step 403 in the email synchronization method shown in FIG. 4 and step 503 in the email synchronization method shown in FIG. 13.

In this embodiment of this application, further, as shown in FIG. 15, the mobile terminal may further include a synchronization unit 63, a determining unit 64, a monitoring unit 65, and a display unit 66.

The synchronization unit 63 is configured to support the mobile terminal in executing step 405 and step 408 in the email synchronization method shown in FIG. 4 and step 505 and step 507 in the email synchronization method shown in FIG. 13.

The determining unit 64 is configured to support the mobile terminal in executing step 402 and step 406 in the email synchronization method shown in FIG. 4 and step 502 in the email synchronization method shown in FIG. 13.

The monitoring unit 65 is configured to support the mobile terminal in executing step 407 in the email synchronization method shown in FIG. 4 and step 506 in the email synchronization method shown in FIG. 13.

The display unit 66 is configured to support the mobile terminal in executing 404 in the email synchronization method shown in FIG. 4 and step 504 in the email synchronization method shown in FIG. 13.

It should be noted that, all related content of each step in the foregoing method embodiments may be cited in function descriptions of a corresponding function module. Details are not described herein again.

The mobile terminal provided in this embodiment of this application is configured to perform the foregoing email synchronization method, and therefore can achieve an effect the same as that achieved in the foregoing email synchronization method.

Figure 16:
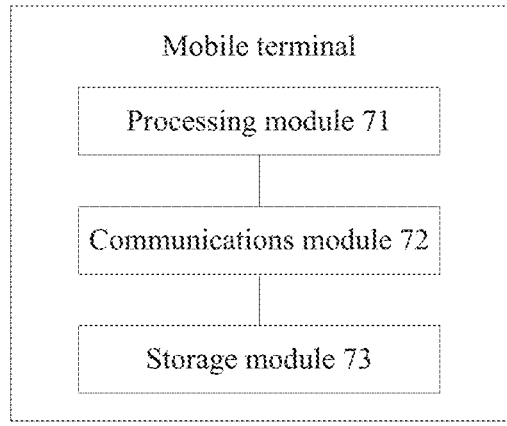
FIG. 16 is another schematic composition diagram of a mobile terminal according to an embodiment of this application.

When an integrated unit is used, FIG. 16 is another possible schematic composition diagram of the mobile terminal in the foregoing embodiments. As shown in FIG. 16, the mobile terminal may include a processing module 71 and a communications module 72.

The processing module 71 is configured to perform control management on actions of the mobile terminal. For example, The processing module 71 is configured to support the mobile terminal in executing step 401, step 402, step 403, step 404, step 405, step 406, step 407, and step 408 in the email synchronization method shown in FIG. 4; step 501, step 502, step 503, step 504, step 505, step 506, and step 507 in the email synchronization method shown in FIG. 5, and/or another process used in the technology described in this specification. The communications module 72 is configured to support communication between the mobile terminal and another network entity, for example, communication between the mobile terminal and a function module or a network entity shown in FIG. 2. The mobile terminal may further include a storage module 73 configured to store program code and data of the mobile terminal.

The processing module 71 may be a processor or a controller. It may implement or execute various example logical blocks, modules, and circuits that are described with reference to the content disclosed in this application. The processor may alternatively be a combination of computing functions, for example, a combination of one or more microprocessors or a combination of a DSP and a microprocessor. The communications module 72 may be a transceiver, a transceiver circuit, a communications interface, or the like. The storage module 73 may be a memory.

When the processing module 71 is a processor, the communications module 72 is a communications interface, and the storage module 73 is a memory, the mobile terminal in the embodiments of this application may be the mobile terminal shown in FIG. 3.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or part of the functions described above.

In the several embodiments according to this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific embodiments of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. An email synchronization method implemented by a mobile terminal, the email synchronization method comprising:
    obtaining an email synchronization instruction;
    obtaining a network signal quality of the mobile terminal after obtaining the email synchronization instruction;
    cancelling execution of a synchronization operation at a first synchronization time point in a synchronization period when the network signal quality is less than a first preset threshold; and
    cancelling execution of the synchronization operation at the first synchronization time point when the mobile terminal both executes the synchronization operation at a second synchronization time point in the synchronization period and when the network signal quality is greater than or equal to the first preset threshold and less than a second preset threshold,
    wherein the second synchronization time point is adjacent to and earlier than the first synchronization time point.

2. The email synchronization method of claim 1, wherein obtaining the email synchronization instruction comprises receiving the email synchronization instruction from a user.

3. The email synchronization method of claim 1, wherein obtaining the email synchronization instruction comprises obtaining the email synchronization instruction from the mobile terminal at the first synchronization time point.

4. The email synchronization method of claim 1, further comprising executing the synchronization operation at the first synchronization time point when both the synchronization operation is not executed at the second synchronization time point and the network signal quality is greater than or equal to the first preset threshold and less than the second preset threshold.

5. The email synchronization method of claim 1, further comprising:
identifying that the network signal quality is greater than or equal to the second preset threshold; and
executing the synchronization operation at the first synchronization time point based on identifying that the network signal quality is greater than or equal to the second preset threshold.

6. The email synchronization method of claim 1, wherein after cancelling the execution of the synchronization operation at the first synchronization time point, the email synchronization method further comprises:
monitoring the network signal quality;
identifying that the network signal quality is greater than or equal to the second preset threshold; and
executing the synchronization operation at a current time point based on identifying that the network signal quality is greater than or equal to the second preset threshold.

7. The email synchronization method of claim 3, further comprising configuring the synchronization period based on the network signal quality.

8. The email synchronization method of claim 1, wherein after cancelling the execution of the synchronization operation at the first synchronization time point, the email synchronization method further comprises displaying prompt information that instructs to cancel execution of the synchronization operation.

9. A mobile terminal, comprising:
a processor; and
a memory coupled to the processor and storing a computer program that, when executed by the processor, causes the mobile terminal to:
obtain an email synchronization instruction;
obtain network signal quality of the mobile terminal;
cancel execution of a synchronization operation at a first time synchronization point in a synchronization period when the network signal quality is less than a first preset threshold; and
cancel the execution of the synchronization operation at the first time synchronization point when the mobile terminal both executes the synchronization operation at a second synchronization time point in the synchronization period and when the network signal quality is greater than or equal to the first preset threshold and less than a second preset threshold,
wherein the second synchronization time point is adjacent to and earlier than the first synchronization time point.

10. A non-transitory computer-readable storage medium configured to store a computer program that, when executed by a processor, causes a mobile terminal to:
obtain an email synchronization instruction;
obtain network signal quality of the mobile terminal;
cancel execution of a synchronization operation at a first time synchronization point in a synchronization period when the network signal quality is less than a first preset threshold; and
cancel the execution of the synchronization operation at the first time synchronization point when the mobile terminal both executes the synchronization operation at a second synchronization time point in the synchronization period and the network signal quality is greater than or equal to the first preset threshold and less than a second preset threshold,
wherein the second synchronization time point is adjacent to and earlier than the first synchronization time point.

11. A computer program product comprising computer-executable instructions for storage on a non-transitory computer-readable medium that, when executed by a processor, cause a mobile terminal to:
obtain an email synchronization instruction;
obtain network signal quality of the mobile terminal;
cancel execution of a synchronization operation at a first time synchronization point in a synchronization period when the network signal quality is less than a first preset threshold; and
cancel the execution of the synchronization operation at the first time synchronization point when the mobile terminal both executes the synchronization operation at a second synchronization time point in the synchronization period and when the network signal quality is greater than or equal to the first preset threshold and less than a second preset threshold,
wherein the second synchronization time point is adjacent to and earlier than the first synchronization time point.

12. The mobile terminal of claim 9, wherein the computer program causes the mobile terminal to obtain the email synchronization instruction by causing the mobile terminal to receive the email synchronization instruction from a user.

13. The mobile terminal of claim 9, wherein the computer program causes the mobile terminal to obtain the email synchronization instruction from the mobile terminal at the first synchronization time point.

14. The mobile terminal of claim 13, wherein the computer program further causes the processor to configure the synchronization period based on the network signal quality.

15. The mobile terminal of claim 9, wherein the computer program further causes the mobile terminal to execute the synchronization operation at the first synchronization time point when both the synchronization operation is not executed at the second synchronization time point and the network signal quality is greater than or equal to the first preset threshold and less than the second preset threshold.

16. The mobile terminal of claim 9, wherein the computer program further causes the mobile terminal to:
identify that the network signal quality is greater than or equal to the second preset threshold; and
execute the synchronization operation at the first synchronization time point based on identifying that the network signal quality is greater than or equal to the second preset threshold.

17. The mobile terminal of claim 9, wherein after cancelling the execution of the synchronization operation at the first synchronization time point, the computer program further causes the mobile terminal to:
monitor the network signal quality;
identify that the network signal quality is greater than or equal to the second preset threshold; and
execute the synchronization operation at a current time point based on identifying that the network signal quality is greater than or equal to the second preset threshold.

18. The mobile terminal of claim 9, wherein after cancelling the execution of the synchronization operation at the first synchronization time point, the computer program further causes the mobile terminal to display prompt information that instructs to cancel the execution of the synchronization operation.

19. The computer program product of claim 11, wherein the computer-executable instructions cause the mobile terminal to obtain the email synchronization instruction by causing the mobile terminal to receive the email synchronization instruction from a user.

20. The computer program product of claim 11, wherein the computer-executable instructions cause the mobile terminal to obtain the email synchronization instruction by causing the mobile terminal to obtain the email synchronization instruction from the mobile terminal at the first synchronization time point.

* * * * *